United States Patent
Yuwaki et al.

(10) Patent No.: US 11,167,485 B2
(45) Date of Patent: Nov. 9, 2021

(54) THREE-DIMENSIONAL SHAPING APPARATUS AND NOZZLE UNIT

(71) Applicant: Seiko Epson Corporation, Tokyo (JP)

(72) Inventors: Kohei Yuwaki, Shiojiri (JP); Koichi Saito, Matsumoto (JP); Taki Hashimoto, Shiojiri (JP)

(73) Assignee: Seiko Epson Corporation

( * ) Notice: Subject to any disclaimer, the term of this patent is extended or adjusted under 35 U.S.C. 154(b) by 35 days.

(21) Appl. No.: 16/507,155

(22) Filed: Jul. 10, 2019

(65) Prior Publication Data

US 2020/0016832 A1 Jan. 16, 2020

(30) Foreign Application Priority Data

Jul. 11, 2018 (JP) ............................. JP2018-131234

(51) Int. Cl.
*B29C 64/209* (2017.01)
*B33Y 30/00* (2015.01)
*B01D 29/05* (2006.01)
*B29C 64/20* (2017.01)

(52) U.S. Cl.
CPC ............ *B29C 64/20* (2017.08); *B29C 64/209* (2017.08); *B01D 29/05* (2013.01); *B01D 2201/184* (2013.01); *B33Y 30/00* (2014.12)

(58) Field of Classification Search
CPC ..... B29C 64/209; B29C 48/693; B29C 64/20; B33Y 30/00; B01D 29/05
See application file for complete search history.

(56) References Cited

U.S. PATENT DOCUMENTS

| 2,513,795 A | * | 7/1950 | Gliss | ....................... B29C 48/34 |
| | | | | 137/545 |
| 4,834,294 A | | 5/1989 | Herzog | |

(Continued)

FOREIGN PATENT DOCUMENTS

| EP | 0 163 614 A2 | 12/1985 |
| JP | S60-260314 A | 12/1985 |

(Continued)

*Primary Examiner* — Joseph S Del Sole
*Assistant Examiner* — Jerzi H Moreno Hernandez
(74) *Attorney, Agent, or Firm* — Harness, Dickey & Pierce, P.L.C.

(57) ABSTRACT

A three-dimensional shaping apparatus includes a melted material generator, a nozzle, a flow passage, a filter chamber, and a filter. The melted material generator generates a melted shaping material. The nozzle discharges the shaping material from the melted material generator. The shaping material is guided to the nozzle through the flow passage. The filter chamber is provided between the flow passage and the nozzle. The filter is disposed in the filter chamber and has pores through which the shaping material passes. A filter chamber cross-sectional area is larger than a flow passage cross-sectional area, and a filter cross-sectional area is larger than the flow passage cross-sectional area. The filter chamber cross-sectional area and filter cross-sectional area are perpendicular to a direction from the flow passage toward the nozzle, and the flow passage cross-sectional area is perpendicular to a flowing direction of the shaping material in the flow passage.

9 Claims, 8 Drawing Sheets

(56) References Cited

U.S. PATENT DOCUMENTS

| | | | | |
|---|---|---|---|---|
| 5,141,631 A * | 8/1992 | Whitman | ............... | B01D 29/05 |
| | | | | 210/108 |
| 5,633,021 A * | 5/1997 | Brown | ................... | B29C 64/40 |
| | | | | 425/375 |
| 2003/0047506 A1 | 3/2003 | Suehara et al. | | |
| 2005/0186301 A1 * | 8/2005 | Koumo | ................... | B29C 48/38 |
| | | | | 425/143 |
| 2006/0099299 A1 * | 5/2006 | Wang | ................... | B29C 45/464 |
| | | | | 425/585 |
| 2009/0002469 A1 * | 1/2009 | Imai | .................... | B41J 2/17563 |
| | | | | 347/93 |
| 2009/0061205 A1 * | 3/2009 | Hokazono | ............. | B01D 69/02 |
| | | | | 428/316.6 |
| 2015/0130100 A1 * | 5/2015 | Fiegener | ............... | B29C 64/393 |
| | | | | 264/40.1 |
| 2015/0321419 A1 * | 11/2015 | Linthicum | ............ | B33Y 30/00 |
| | | | | 264/308 |
| 2017/0210069 A1 * | 7/2017 | Stubenruss | ............ | B29C 64/118 |
| 2019/0070778 A1 * | 3/2019 | Haid | .................... | B29C 64/118 |

FOREIGN PATENT DOCUMENTS

| | | | | |
|---|---|---|---|---|
| JP | S63-262216 A | | 10/1988 | |
| JP | H06-087136 A | | 3/1994 | |
| JP | H06-206240 A | | 7/1994 | |
| JP | 08207122 A | * | 8/1996 | ......... B29C 48/6801 |
| JP | H10-217281 A | | 8/1998 | |
| JP | 2003-080560 A | | 3/2003 | |
| JP | 2003-334841 A | | 11/2003 | |
| JP | 2006-192710 A | | 7/2006 | |
| KR | 101665531 B1 | * | 10/2016 | |

* cited by examiner

THREE-DIMENSIONAL SHAPING APPARATUS AND NOZZLE UNIT

The present application is based on, and claims priority from, JP Application Serial Number 2018-131234, filed Jul. 11, 2018, the disclosure of which is hereby incorporated by reference herein in its entirety.

BACKGROUND

1. Technical Field

The present disclosure relates to a three-dimensional shaping apparatus.

2. Related Art

For example, a three-dimensional shaping apparatus that shapes a three-dimensional shaped object by extruding a melted shaping material from a nozzle and depositing the melted shaping material on a base is disclosed in JP-A-2006-192710.

In the related art, in the three-dimensional shaping apparatus, mixing of foreign substances in the shaping material have not been considered as a particular case. However, when such foreign substances are mixed in the shaping material, the nozzle may be blocked by the foreign substances.

SUMMARY

According to an aspect of the disclosure, there is provided a three-dimensional shaping apparatus including: a generation unit that generates a melted shaping material; a nozzle that discharges the shaping material generated by the generation unit; a flow passage through which the shaping material is guided to the nozzle; a filter chamber that is provided between the flow passage and the nozzle, a cross-sectional area of a cross section perpendicular to a direction from the flow passage toward the nozzle being larger than a flow passage cross-sectional area, which is a cross-sectional area of the flow passage, of a cross section perpendicular to a flowing direction of the shaping material in the flow passage; and a filter that has pores through which the shaping material passes and is disposed in the filter chamber, a cross-sectional area of a cross section perpendicular to a direction from the flow passage toward the nozzle being larger than the flow passage cross-sectional area.

DESCRIPTION OF EXEMPLARY EMBODIMENTS

1. First Embodiment

Figure 1:
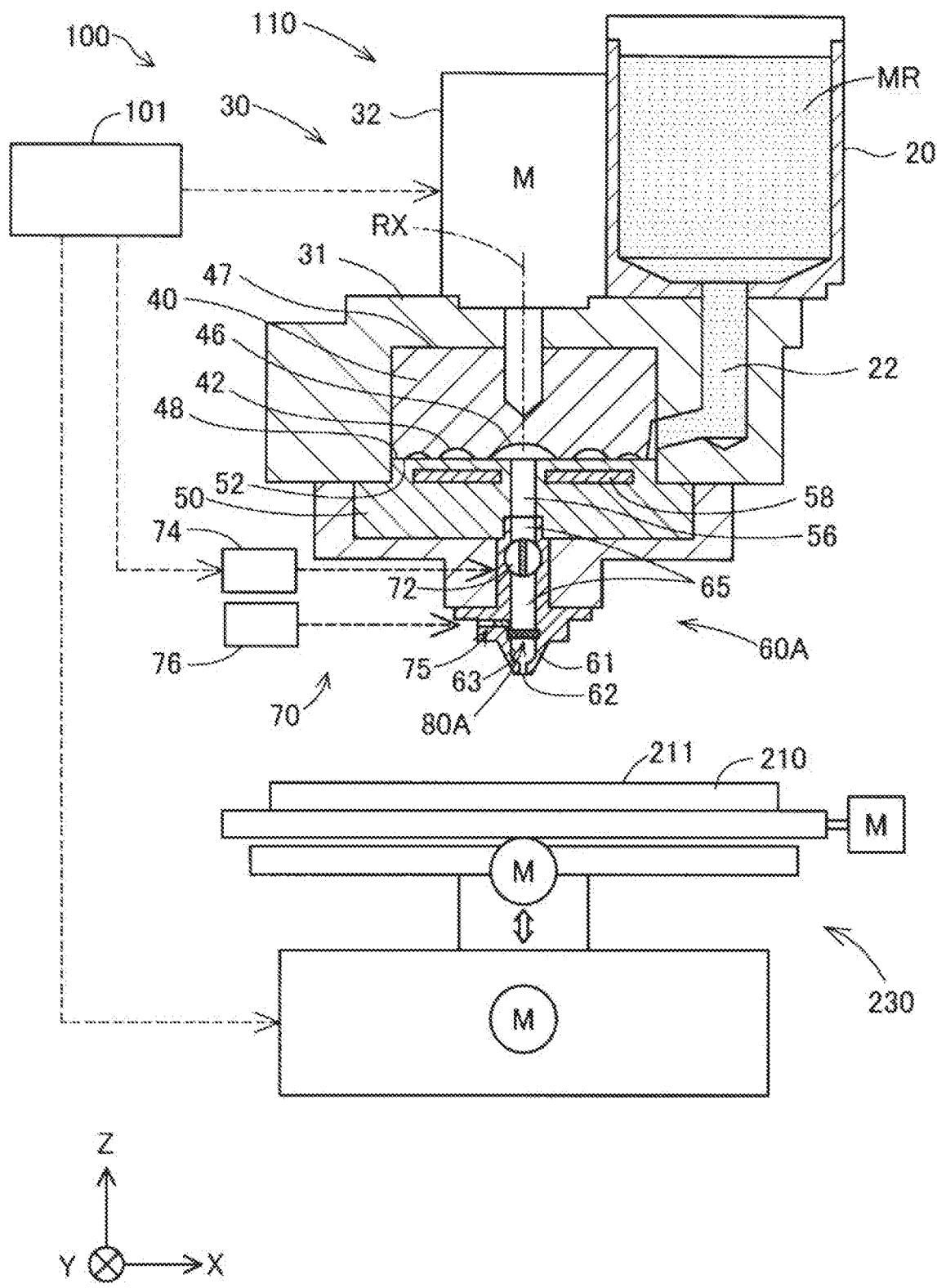
FIG. 1 is a schematic view showing a configuration of a three-dimensional shaping apparatus according to a first embodiment.

FIG. 1 is a schematic view showing a configuration of a three-dimensional shaping apparatus 100 having a nozzle unit 60A according to the first embodiment. In FIG. 1, arrows indicating X, Y, and Z directions perpendicular to each other are shown. The X direction and the Y direction are parallel to the horizontal plane and the Z direction is a vertical direction, that is, a direction opposite to the gravity direction. The arrows indicating the X, Y, and Z directions are appropriately shown such that the shown directions correspond to those in FIG. 1 also in the other reference drawings.

The three-dimensional shaping apparatus 100 shapes a three-dimensional shaped object by depositing a shaping material. Hereinafter, the "three-dimensional shaping apparatus" is simply referred to as a "shaping apparatus", and the three-dimensional shaped object is simply referred to as a "shaped object". The "shaping material" will be described below. The shaping apparatus 100 includes a controller 101 that controls the shaping apparatus 100, a shaping unit 110 that generates and discharges the shaping material, a table 210 for shaping, which is a base of the shaped object, and a movement mechanism 230 that controls a discharge position of the shaping material.

The controller 101 controls the entire operation of the shaping apparatus 100 to execute shaping processing of shaping the shaped object. In the first embodiment, the controller 101 is configured with a computer including one or more processors and a main storage device. The controller 101 performs various functions by the processors executing programs and instructions read onto the main storage device. Some of the functions of the controller 101 may be realized by a hardware circuit. In the shaping processing executed by the controller 101, the controller 101 controls the shaping unit 110 and the movement mechanism 230 according to shaping data of the shaped object. Further, in the first embodiment, the controller 101 executes maintenance processing for a filter unit 80A while not performing the shaping processing. Details of the maintenance processing will be described below.

The shaping unit 110 discharges a melted paste-like shaping material to a target position on the table 210, under a control of the controller 101. The shaping unit 110 includes a material supplying unit 20 that is a supply source of a raw material MR before conversion to the shaping material, a shaping material generating unit 30 that converts the raw material MR into the shaping material, and a nozzle unit 60A that discharges the shaping material.

The material supplying unit 20 supplies, to the shaping material generating unit 30, the raw material MR for generating the shaping material. The material supplying unit 20 is configured with, for example, a hopper for accommodating the raw material MR. The material supplying unit 20 has a discharge port on a lower side. The corresponding discharge port is connected to the shaping material generating unit 30 through a communication passage 22. In the first embodiment, the raw material MR is supplied to the material supplying unit 20 in the form of a pellet, powder, or the like.

The shaping material generating unit 30 melts the raw material MR supplied from the material supplying unit 20 to generate the paste-like shaping material of which fluidity is expressed and leads the paste-like shaping material to the nozzle unit 60A. Hereinafter, the shaping material generating unit 30 is simply referred to as a "generation unit 30". The generation unit 30 includes a screw case 31, a driving motor 32, a flat screw 40, and a screw facing portion 50.

The flat screw 40 has a substantially cylindrical shape of which the height in an axial direction that is a direction along a central axis is smaller than a diameter. The flat screw 40 is disposed such that the axial direction is parallel to the Z direction, and rotates along a circumferential direction. In the first embodiment, the central axis of the flat screw 40 coincides with a rotational axis RX thereof. In FIG. 1, the rotational axis RX of the flat screw 40 is shown by a one-dot chain line.

The flat screw 40 is accommodated in the screw case 31. An upper surface 47 side of the flat screw 40 is connected to the driving motor 32. The flat screw 40 rotates in the screw case 31 by a rotational driving force generated by the driving motor 32. The driving motor 32 is driven under the control of the controller 101.

In the flat screw 40, a groove portion 42 is formed on a lower surface 48 that is a surface intersecting the rotational axis RX. The communication passage 22 of the material supplying unit 20 is connected to the corresponding groove portion 42 from a side surface of the flat screw 40.

The lower surface 48 of the flat screw 40 faces an upper surface 52 of the screw facing portion 50, and a space is formed between the groove portion 42 of the lower surface of the flat screw 40 and the upper surface 52 of the screw facing portion 50. In the shaping unit 110, the raw material MR is supplied from the material supplying unit 20 to the space between the flat screw 40 and the screw facing portion 50. Detailed configurations of the flat screw 40 and the groove portion 42 thereof will be described below.

The screw facing portion 50 includes a heater 58 for heating the raw material MR supplied into the groove portion 42 of the flat screw 40 rotating. The raw material MR supplied into the groove portion 42 of the flat screw 40 flows along the groove portion 42 by the rotation of the flat screw 40 while being melted in the groove portion 42, and is guided to a central portion 46 of the flat screw 40 as the shaping material. The paste-like shaping material which has flowed into the central portion 46 and of which fluidity is expressed is supplied to the nozzle unit 60A through a communication hole 56 provided at a center of the screw facing portion 50. In the shaping material, all types of substances that constitute the shaping material may not be melted. The shaping material may be converted into a state of having fluidity as a whole by melting at least some of the types of substances constituting the shaping material.

The nozzle unit 60A includes a nozzle 61 through which the shaping material is discharged, a flow passage 65 for guiding the shaping material generated by the generation unit 30 to the nozzle 61, a flow rate controller 70 that controls a flow rate of the shaping material in the flow passage 65, and a filter unit 80A for removing foreign substances in the shaping material. In the present specification, the "foreign substances in the shaping material" mean a substance that exceeds a predetermined specific size and is not expected to exist in the shaping material. Substances constituting the foreign substances include not only substances not intended to be contained in the shaping material but also substances which are contained in the shaping material and of which the sizes exceed a specific size among the substances constituting the shaping material. The foreign substances include substances of which the sizes exceed a specific size and a mass of the shaping materials obtained by solidifying some of the shaping materials, which become larger than a specific size, among degraded materials generated by thermal degradation of the substances constituting the shaping material.

The nozzle 61 is connected to the communication hole 56 of the screw facing portion 50 through the flow passage 65. The nozzle 61 discharges the shaping material generated by the generation unit 30 from a discharge port 62 at a tip end thereof toward the table 210. In the present specification, the phrase "discharges the shaping material" means that the shaping material having fluidity is made to flow outward by applying a pressure to the shaping material. In the first embodiment, the flow passage 65 extends along the Z direction, and the flow passage 65 and the nozzle 61 are arranged along the Z direction.

The flow rate controller 70 is provided in the flow passage 65. In the first embodiment, the flow rate controller 70 includes an opening and closing mechanism 72 that opens and closes the flow passage 65 and a negative pressure generating mechanism 75 that is provided closer to the nozzle 61 than the opening and closing mechanism 72 and generates a negative pressure in the flow passage 65 by sucking the shaping material of the flow passage 65. The flow rate controller 70 further includes a first driving unit 74 that generates a driving force for opening and closing the opening and closing mechanism 72 under the control of the controller 101 and a second driving unit 76 that generates a driving force for driving the negative pressure generating mechanism 75 under the control of the controller 101. Details of the flow rate controller 70 will be described below.

The filter unit 80A is provided closer to the nozzle 61 than to the flow rate controller 70. The filter unit 80A supplements foreign substances having the sizes exceeding a specific size in the shaping material to suppress reach of the foreign substances to the discharge port 62. Further, the filter unit 80A suppresses reach of the foreign substances introduced into the nozzle 61 through the discharge port 62, to the flow passage 65. Details of the filter unit 80A will be described below.

The nozzle unit 60A further includes a nozzle flow passage 63 provided closer to the nozzle 61 than to the filter unit 80A to communicate with the discharge port 62 of the nozzle 61. The flow passage cross-sectional area of the nozzle flow passage 63 is larger than the opening area of the discharge port 62. In the first embodiment, the flow passage cross-sectional area of the nozzle flow passage 63 is substantially the same as the flow passage 65. Here, the "flow passage cross-sectional area" means a cross section of the flow passage, which is perpendicular to a flowing direction of the shaping material, that is, an opening area of the flow passage in a cross section perpendicular to a central axis of the flow passage. In the flow passage 65, the "flowing direction of the shaping material" means a direction toward the nozzle 61 along the flow passage 65.

The table 210 is disposed at a position facing the discharge port 62 of the nozzle 61. In the first embodiment, a surface 211 of the table 210, facing the discharge port 62 of the nozzle 61, is disposed horizontally, that is, in parallel to the X and Y directions. As will be described below, the shaping apparatus 100 shapes the shaped object by depositing the shaping material on the surface 211 of the table 210 in the shaping processing.

The movement mechanism 230 changes a relative positional relationship between the table 210 and the nozzle 61. In the first embodiment, a position of the nozzle 61 is fixed, and the movement mechanism 230 moves the table 210. The movement mechanism 230 is configured with a three-axis positioner that moves the table 210 in three axial directions including the X, Y, and Z directions by the driving forces of three motors M. The movement mechanism 230 changes a relative positional relationship between the nozzle 61 and the table 210 under the control of the controller 101.

In another embodiment, instead of the configuration in which the table 210 is moved by the movement mechanism 230, a configuration may be adopted in which the movement mechanism 230 moves the nozzle 61 with respect to the table 210 in a state in which a position of the table 210 is fixed. Even in this configuration, the movement mechanism 230 can change the relative positional relationship of the nozzle 61 with respect to the table 210. Further, in another embodiment, a configuration may be adopted in which the movement mechanism 230 changes a relative position between the table 210 and the nozzle 61 by moving the table 210 and the nozzle 61.

Figure 2:
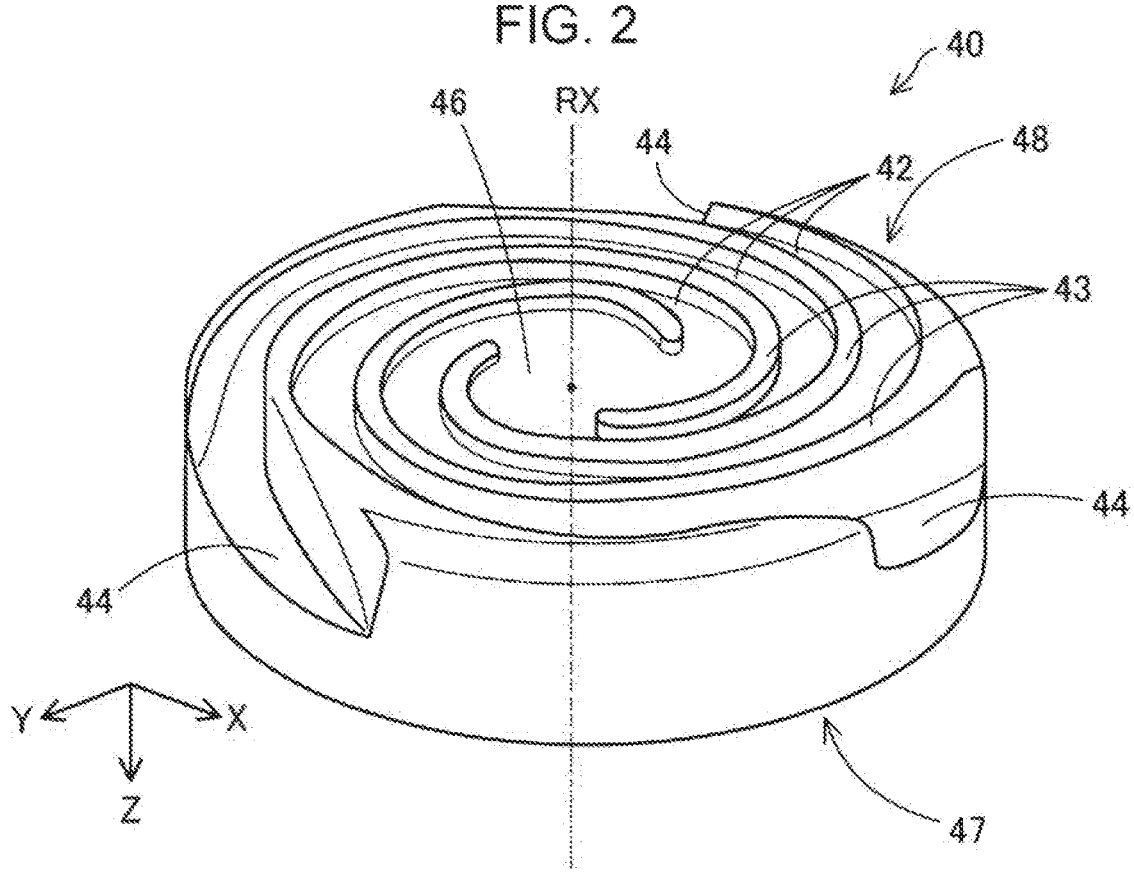
FIG. 2 is a schematic perspective view showing a configuration of a flat screw.

FIG. 2 is a schematic perspective view showing a configuration of the lower surface 48 of the flat screw 40. In FIG. 2, a position of the rotary shaft RX of the flat screw 40 of the generation unit 30 is shown by a one-dot chain line. As described with reference to FIG. 1, the groove portion 42 is provided on the lower surface 48 of the flat screw 40, facing the screw facing portion 50. Hereinafter, the lower surface 48 is referred to as a "groove formation surface 48".

A central portion 46 of the groove formation surface 48 of the flat screw 40 is configured as a concave portion to which one end of the groove portion 42 is connected. The central portion 46 faces the communication hole 56 of the screw facing portion 50 shown in FIG. 1. In the first embodiment, the central portion 46 intersects the rotary shaft RX.

The groove portion 42 of the flat screw 40 constitutes a so-called screw groove. The groove portion 42 extends spirally in an arc shape from the central portion 46 toward an outer circumference of the flat screw 40. The groove portion 42 may extend in a spiral shape. The groove formation surface 48 is provided with a ridge portion 43 that constitutes a side wall portion of the groove portion 42 and extends along each groove portion 42.

The groove portion 42 extends to a material inlet formed on a side surface of the flat screw 40. The material inlet 44 is a portion for receiving the raw material MR supplied through the communication passage 22 of the material supplying unit 20 shown in FIG. 1.

In FIG. 2, an example of the flat screw 40 having three groove portions 42 and three ridge portions 43 is shown. The numbers of the groove portions 42 and the ridge portions 43 provided in the flat screw 40 are not limited to three. In the flat screw 40, only one groove portion 42 may be provided or two or more groove portions 42 may be provided. Further, the predetermined number of the ridge portions 43 may be provided according to the number of the groove portions 42.

In FIG. 2, an example of the flat screw 40 having material inlets 44 formed at three points is shown. The number of the material inlets 44 provided in the flat screw is not limited to three. In the flat screw 40, the material inlet 44 may be provided only at one point or may be provided at two or more points.

Figure 3:
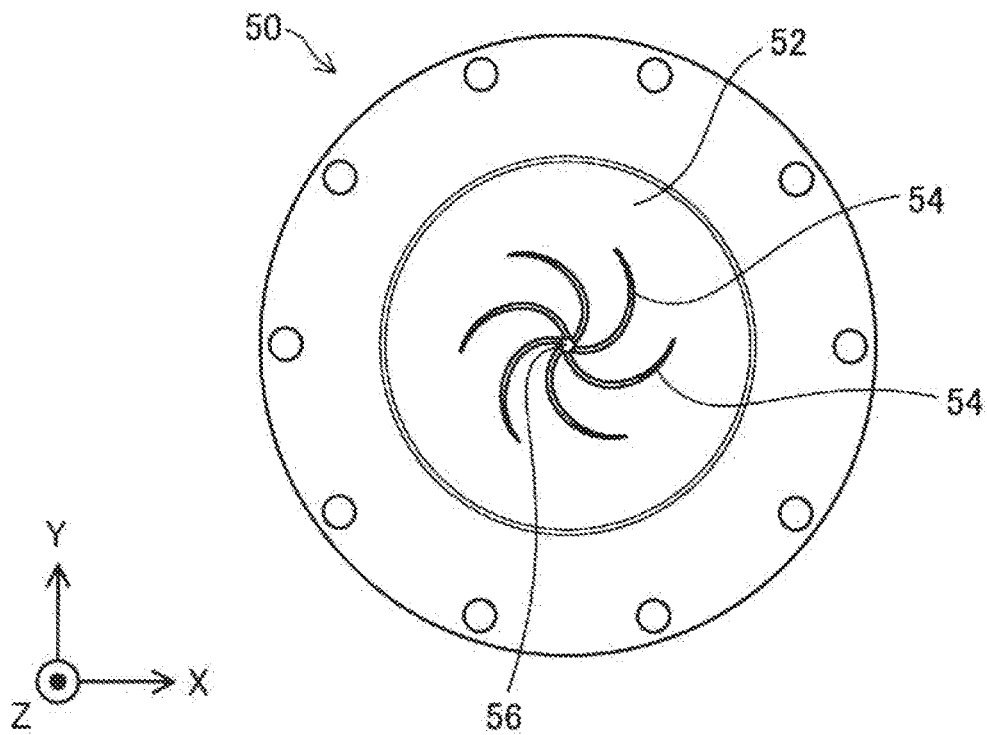
FIG. 3 is a schematic plan view showing a configuration of a screw facing portion.

FIG. 3 is a schematic plan view showing the upper surface 52 side of the screw facing portion 50. As described above, the upper surface 52 of the screw facing portion 50 faces the groove formation surface 48 of the flat screw 40. Hereinafter, the upper surface 52 is referred to as a "screw facing surface 52". The above-described communication hole 56 for supplying the shaping material to the nozzle 61 is formed at a center of the screw facing surface 52.

A plurality of guide grooves 54 connected to the communication hole 56 and extending spirally from the communication hole 56 toward an outer circumference are formed in the screw facing surface 52. The plurality of guide grooves 54 function to guide the shaping material flowing into the central portion 46 of the flat screw 40 to the communication hole 56. As described with reference to FIG. 1, the heater 58 is embedded in the screw facing portion 50. The raw material MR in the generation unit 30 is melted by heating by the heater 58 and rotation of the flat screw 40.

FIGS. 1 and 2 are referred. When the flat screw 40 rotates, the raw material MR supplied from the material inlet 44 is guided to the groove portion 42, and moves toward the central portion 46 while being heated in the groove portion 42. As the raw material MR becomes closer to the central portion 46, the raw material MR is melted, has higher fluidity, and is converted into the shaping material. The shaping material collected in the central portion 46 is guided to the flow passage 65 of the nozzle 61 through the communication hole 56 by an internal pressure generated in the central portion 46, and is discharged from the discharge port 62.

FIG. 1 is referred. In the shaping unit 110, the flat screw 40 having a small size in the Z direction is adopted, and a range occupied by, in the Z direction, a passage through which the raw material MR is melted and is guided to the nozzle 61 is reduced. In this way, in the shaping apparatus 100, since the flat screw 40 is used, a formation mechanism for the shaping material is miniaturized.

In the shaping apparatus 100, since the flat screw 40 is used, a configuration is simply realized in which the shaping material having fluidity is generated and is forcibly fed to the nozzle 61. With this configuration, the discharge amount of the shaping material from the nozzle 61 can be controlled by controlling the number of revolutions of the flat screw 40, and control of the discharge amount of the shaping material from the nozzle 61 is facilitated. The "discharge amount of the shaping material from the nozzle 61" means a flow rate of the shaping material flowing out from the discharge port 62 of the nozzle 61.

In the shaping apparatus 100 having a mechanism for producing the shaping material using the flat screw 40, the shaping material of which the fluidity is expressed is guided to the nozzle 61 through the flow passage 65. In the shaping apparatus 100, as the flow rate controller 70 is provided in such a flow passage 65, the control of the discharge amount of the shaping material is further facilitated.

Materials of the shaped object used in the shaping apparatus 100 will be described. In the shaping apparatus 100, for example, the shaped object can be shaped using various materials including, for example, a thermoplastic material, metal, ceramic, or the like as a main material. Here, the "main material" means a material that is mainly used for forming the shape of the shaped object, and has a content rate of 50% by weight or more of the shaped object. The above-described shaping material includes a material obtained by melting the main material alone or a material obtained by melting some components together with the main material and making the melted materials into a paste state.

When the thermoplastic material is used as the main material, in the generation unit 30, the shaping material is generated by plasticizing the thermoplastic material. The "plasticizing" means that heat is applied to the thermoplastic material to melt the thermoplastic material.

For example, the following thermoplastic resin materials can be used as the thermoplastic material.

Example of Thermoplastic Resin Material

General-purpose engineering plastics such as polypropylene (PP) resin, polyethylene (PE) resin, polyacetal (POM) resin, polyvinyl chloride (PVC) resin, polyamide (PA) resin, acrylonitrile butadiene styrene (ABS) resin, polylactic acid (PLA) resin, polyphenylene sulfide (PPS) resin, polyetheretherketone (PEEK), polycarbonate (PC), modified polyphenylene ether, polybutylene terephthalate, and polyethylene terephtalate, and engineering plastics such as polysulfone, polyether sulfone, polyphenylene sulfide, polyarylate, polyimide, polyamide imide, polyether imide, and polyether ether ketone The thermoplastic material may be mixed with additives such as waxes, flame retardants, antioxidants, and heat stabilizers in addition to pigments, metals, and ceramics. The thermoplastic material is plasticized by the rotation of the flat screw 40 and the heating by the heater 58 and is converted into a molten state, in the generation unit 30. After being discharged from the nozzle 61, the shaping material generated by melting the thermoplastic material is hardened due to a decrease in a temperature.

It is desirable that the thermoplastic material is ejected from the nozzle 61 while being melted completely by being heated at the glass transition point or more. For example, it is desirable that the ABS resin has a glass transition point of about 120° C. and has a glass transition point of about 200° C. when being discharged from the nozzle 61. In order to discharge the shaping material in such a high-temperature state, a heater may be provided around the nozzle 61.

In the shaping apparatus 100, instead of the above-described thermoplastic material, for example, the following metal material may be used as a main material. In this case, it is desirable that a component melted when the shaping material is produced is mixed with a powder material obtained by powdering the following metal material and the mixture as the raw material MR is introduced into the generation unit 30.

Example of Metal Material

Single metals such as magnesium (Mg), iron (Fe), cobalt (Co) or chromium (Cr), aluminum (Al), titanium (Ti), copper (Cu), and nickel (Ni) or alloys containing one or more of these metals Example of Alloy Maraging steel, stainless steel, cobalt chromium molybdenum, titanium alloy, nickel alloy, aluminum alloy, cobalt alloy, and cobalt chromium alloy In the shaping apparatus 100, instead of the above-described metal materials, ceramic materials can be used as the main material. For example, oxide ceramics such as silicon dioxide, titanium dioxide, aluminum oxide, and zirconium oxide, and non-oxide ceramics such as aluminum nitride can be used as a ceramic material. When the above-described metal material or the above-described ceramic material is used as a main material, the shaping material disposed in the table 210 may be hardened by sintering.

The powder material of the metal material or the ceramic material supplied as the raw material MR to the material supplying unit 20 may be a mixed material obtained by mixing a plurality of types of powders such as a single metal powder, an alloy powder, and a ceramic powder. Further, the powder material of the metal material or the ceramic material may be coated with, for example, the above-described thermoplastic resins or other thermoplastic resins. In this case, in the generation unit 30, the thermoplastic resin may be melted to express the fluidity.

For example, the following solvent can be added to the powder material of the metal material or the ceramic material supplied as the raw material MR to the material supplying unit 20. A combination of one or more selected from the following chemical substances can be used as the solvent.

Examples of Solvent water; (poly) alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkyl ammonium acetates; sulfoxide solvents such as dimethyl sulfoxide and diethyl sulfoxide; pyridine solvents such as pyridine, γ-picoline, and 2,6-lutidine; tetraalkyl ammonium acetate (for example, tetrabutyl ammonium acetate, and the like); and ionic liquids such as butyl carbitol acetate In addition, a binder, which will be described below, can be added to the powder material of the metal material or the ceramic material supplied as the raw material MR to the material supplying unit 20.

Examples of Binder

Figure 4:
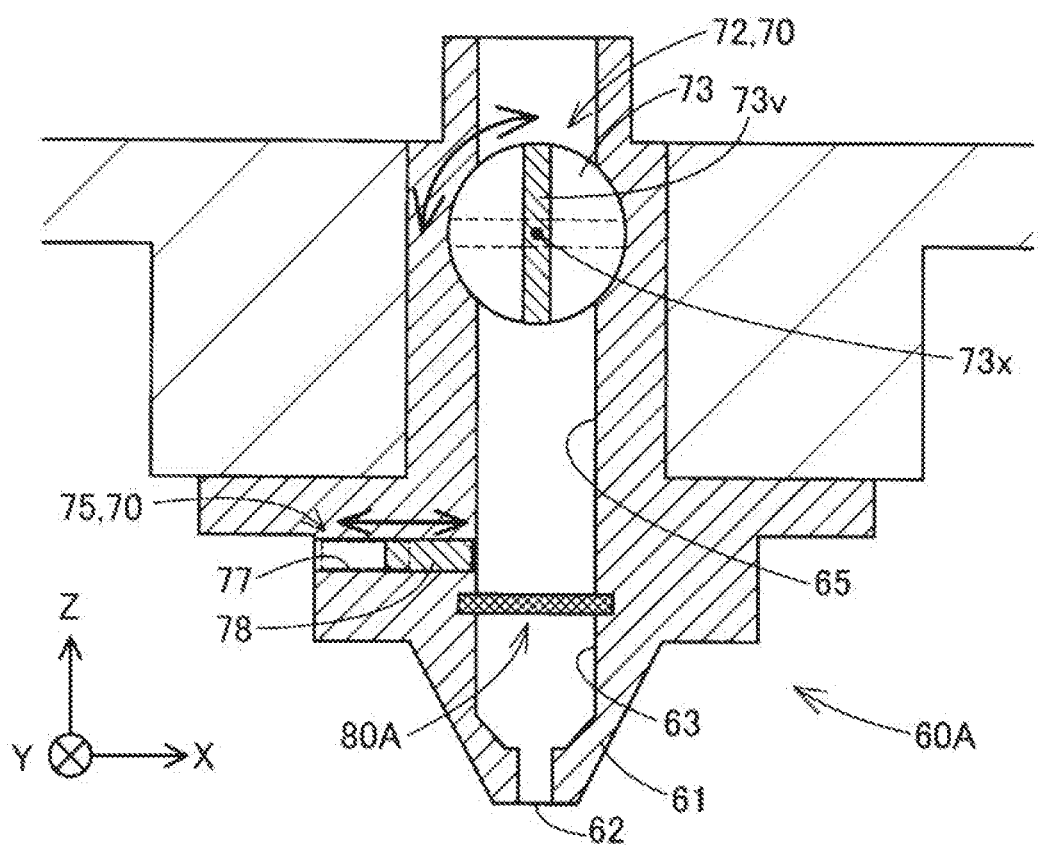
FIG. 4 is a schematic view showing a configuration of a flow rate controller according to the first embodiment.

Acrylic resin, epoxy resin, silicone resin, cellulose resin or other synthetic resin or PLA (polylactic acid), PA (polyamide), PPS (polyphenylene sulfide), PEEK (polyether ether ketone) or other thermoplastic resin FIG. 4 is a schematic view schematically showing a configuration of a flow rate controller 70. In the first embodiment, an opening and closing mechanism 72 of the flow rate controller 70 is configured by a butterfly valve. The opening and closing mechanism 72 includes a driving shaft 73 which is a shaft-shaped member extending in one direction and a valve body 73v which is rotated by rotation of the driving shaft 73. The driving shaft 73 is attached to the flow passage 65 to intersect a flowing direction of the shaping material. In the first embodiment, the driving shaft 73 is disposed parallel to the Y direction to cross the flow passage 65 perpendicularly. The driving shaft 73 is attached rotatably about a central axis 73x thereof.

The valve body 73v is a plate-like member that rotates in the flow passage 65. In the first embodiment, the valve body 73v is formed by processing a portion of the driving shaft 73 disposed in the flow passage 65 into a plate shape. The shape of the valve body 73v when viewed in a direction perpendicular to the surface of the plate is substantially the same as an opening shape of the flow passage 65 at a portion where the valve body 73v is disposed.

A first driving unit 74 shown in FIG. 1 and for driving the opening and closing mechanism 72 is configured with, for example, a stepping motor. The first driving unit 74 rotates the driving shaft 73 to rotate the valve body 73v under a control of the controller 101.

As indicated by a solid line of FIG. 4, a state in which a plate surface of the valve body 73v is along the flowing direction of the shaping material in the flow passage 65 is a state in which the flow passage 65 is open. In this state, inflow of the shaping material from the opening and closing mechanism 72 to the nozzle 61 is allowed. As indicated by a broken line of FIG. 4, a state in which the plate surface of the valve body 73*v* is perpendicular to the flowing direction of the shaping material in the flow passage 65 is a state in which the flow passage 65 is close. In this state, inflow of the shaping material from the opening and closing mechanism 72 to the nozzle 61 is blocked, and discharge of the shaping material from the discharge port 62 of the nozzle 61 is stopped.

In the first embodiment, the negative pressure generating mechanism 75 includes a sub-passage 77 connected to the flow passage 65 and a moving body 78 moving inside the sub-passage 77, and generates a negative pressure in the flow passage 65 by moving the moving body 78 inside the sub-passage 77. The sub-passage 77 extends linearly toward a lateral side of the flow passage 65. The moving body 78 is configured with a rod-like member extending along the sub-passage 77, and is disposed to reciprocate inside the sub-passage 77. It is desirable that a sealing member for suppressing leakage of the shaping material is disposed between a side surface of the moving body 78 and an inner wall surface of the sub-passage 77.

A second driving unit 76 shown in FIG. 1 and for driving the negative pressure generating mechanism 75 is configured with, for example, a solenoid. The second driving unit 76 changes a position of the moving body 78 inside the sub-passage 77 under the control of the controller 101.

In general, as shown in FIG. 4, the second driving unit 76 positions the moving body 78 at a position where an end portion thereof faces the flow passage 65, and blocks inflow of the shaping material to the sub-passage 77. When a negative pressure is generated in the flow passage 65, the second driving unit 76 instantaneously moves the moving body 78 away from the flow passage 65 to a position indicated by a broken line in FIG. 4. Accordingly, the volume of a space communicating with the flow passage 65 in the sub-passage 77 increases, and a part of the shaping material is drawn from the flow passage 65 to the sub-passage 77, so that the negative pressure is generated in the flow passage 65.

For example, in the shaping processing, the controller 101 cause the negative pressure generating mechanism 75 to generate the negative pressure in the flow passage 65 when the opening and closing mechanism 72 is closed, in order to interrupt the discharge of the shaping material from the nozzle 61. Accordingly, after the flow passage 65 is closed by the opening and closing mechanism 72, it is possible to suppress outflow of the remaining shaping material from the nozzle 61. When the flow passage 65 is opened by the opening and closing mechanism 72 and the discharge of the shaping material from the nozzle 61 is resumed, the controller 101 returns the moving body 78 to an original normal position.

In the first embodiment, the controller 101 causes the negative pressure generating mechanism 75 to generate the negative pressure in the flow passage 65 and executes maintenance processing of alleviating clogging of the filters in the filter unit 80A. The controller 101 executes this maintenance processing, for example, while the execution of the shaping process is stopped. The controller 101 causes the negative pressure generating mechanism 75 to periodically and repeatedly generate the negative pressure in the flow passage 65. Accordingly, backflow of the shaping material from the nozzle 61 toward the flow passage 65 is intermittently generated, and the foreign substances are separated from pores of the filter, which will be described below, by a pressure of the shaping material generated by the backflow, so that the clogging of the filter is resolved.

Figure 5:
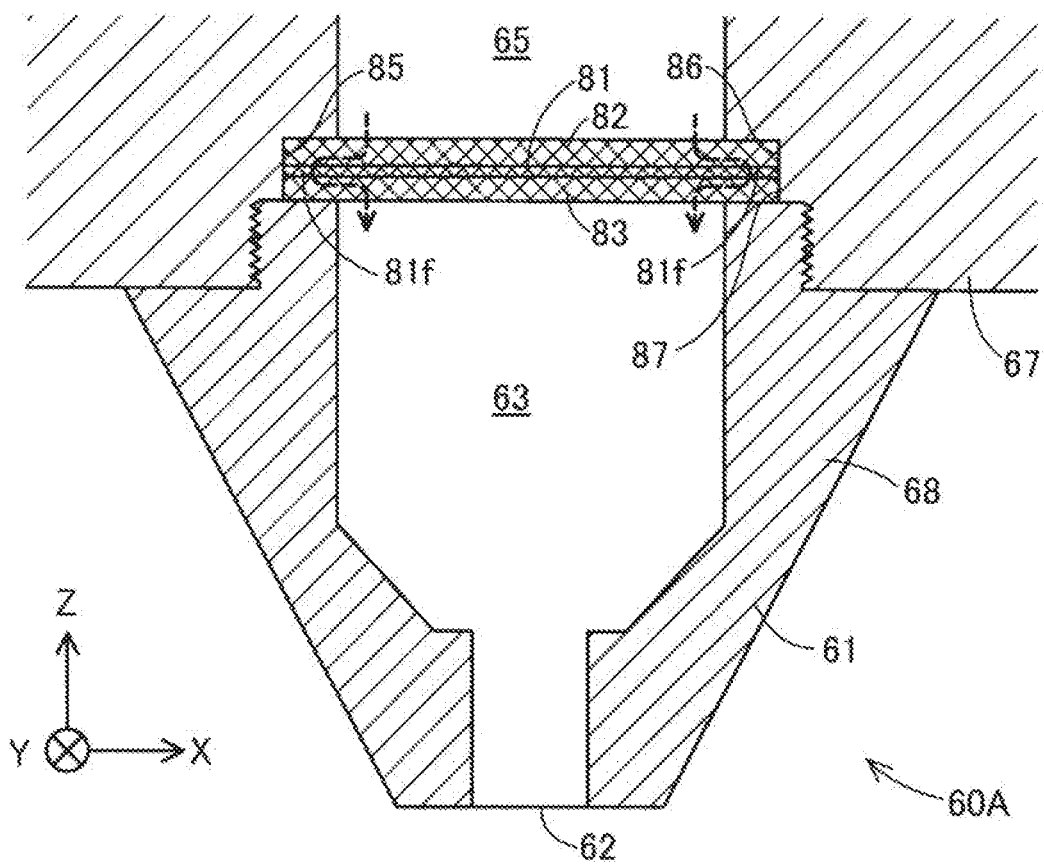
FIG. 5 is a schematic view showing a configuration of a filter unit according to the first embodiment.

FIG. 5 is a schematic view schematically showing a configuration of the filter unit 80A. The filter unit 80A is provided between the flow passage 65 and the nozzle 61. The filter unit 80A includes filters 81, 82, and 83 and a filter chamber 85 accommodating the filters 81, 82, and 83.

The filter chamber 85 is provided between the flow passage 65 and the nozzle 61, and is connected to an end portion of the flow passage 65 on the nozzle 61 side. In the first embodiment, an end portion of the flow passage 65 on the nozzle 61 side is connected to substantially a center of a wall surface of the filter chamber 85 on the flow passage 65 side. The cross-sectional area of the filter chamber 85 in a cross section perpendicular to a direction from the flow passage 65 to the nozzle 61 is larger than the flow passage cross-sectional area of the flow passage 65 in the direction from the flow passage 65 to the nozzle 61. In the first embodiment, the direction from the flow passage 65 to the nozzle 61 in the filter chamber 85 is a direction opposite to the Z direction. Here, the cross-sectional area of the filter chamber 85 is the cross-sectional area of the space in a state in which the filters 81, 82, and 83 are not arranged. Further, the cross-sectional area corresponds to the flow passage cross-sectional area when the filter chamber 85 is regarded as a flow passage of the shaping material.

The respective filters 81, 82, and 83 are in the form of a film, and are accommodated in the filter chamber 85 in a laminated state. The filters 81, 82, and 83 are arranged such that a lamination direction thereof coincides with the flowing direction of the shaping material from the flow passage 65 to the nozzle 61.

Hereinafter, the filter 81 disposed at a center in the lamination direction and having pores, which will be described below and has the smallest diameter, is referred to as a "main filter 81". The filter 82 is laminated on a surface of the main filter 81 on the flow passage 65 side. Hereinafter, the filter 82 is referred to as a "flow passage-side filter 82". The filter 83 is laminated on a surface of the main filter 81 on the nozzle 61 side. Hereinafter, the filter 83 is referred to as a "nozzle-side filter 83". The main filter 81 is interposed between the flow passage-side filter 82 and the nozzle-side filter 83. The flow passage-side filter 82 covers a surface of the filter 81 on the flow passage 65 side, and the nozzle-side filter 83 covers the surface of the main filter 81 on the nozzle 61 side.

In the first embodiment, the main filter 81 is located substantially at a center of the filter chamber 85 in the Z direction, and is disposed in the entire filter chamber 85 in the X direction or the Y direction. In the first embodiment, the filter chamber 85 is partitioned into a first filter chamber 86 and a second filter chamber 87 by the main filter 81. The first filter chamber 86 is an area closer to the flow passage 65 than the main filter 81. The flow passage-side filter 82 is accommodated in the first filter chamber 86. The second filter chamber 87 is an area between the main filter 81 and the nozzle 61. In the first embodiment, the nozzle-side filter 83 is accommodated in the second filter chamber 87. In the first embodiment, the flow passage-side filter 82 is in contact with the wall surface of the filter chamber 85 on the flow passage 65 side, and the nozzle-side filter 83 is in contact with a wall surface of the filter chamber 85 on the nozzle 61 side. In the first embodiment, the filters 81, 82, and 83 are arranged in the entire filter chamber 85.

It is preferable that the main filter 81 is thin to suppress an increase in pressure loss, and has a thickness of, for example, 0.1 mm or less. In contrast, in the first embodiment, it is preferable that the flow passage-side filter 82 and the nozzle-side filter 83 have larger thicknesses than a thickness of the main filter 81 to obtain strength for supporting the main filter 81. The flow passage-side filter 82 and the nozzle-side filter 83 may have the thicknesses of, for example, 0.1 mm to 1.0 mm. However, in another embodiment, the flow passage-side filter 82 and the nozzle-side filter 83 may have the same thickness or may have different thicknesses. Further, the flow passage-side filter 82 and the nozzle-side filter 83 may have the same thickness as the main filter 81 or may have a smaller thickness than the thickness of the main filter 81.

Each of the filters 81, 82, and 83 has pores through which the shaping material passes in a thickness direction. Here, the thickness direction of the filters 81, 82, and 83 means a direction from the flow passage 65 to the nozzle 61 or a direction from the nozzle 61 to the flow passage 65. In the first embodiment, the pores of the filters 81, 82, and 83 are configured with minute through-holes penetrating the filters 81, 82, and 83 in the thickness direction and closely arranged in a surface. The pores of the filters 81 to 83 are formed by etching processing or press processing. Details of the pores of the filters 81 to 83 will be described below.

When viewed in the direction from the flow passage 65 to the nozzle 61, the filters 81, 82, and 83 are arranged at positions overlapping the end portion of the flow passage 65 on the nozzle 61 side. Further, opposite surfaces of the filters 81, 82, and 83 have an area that is larger than the flow passage cross-sectional area of the flow passage 65. Therefore, the cross-sectional area perpendicular to the direction from the flow passage 65 of the filters 81, 82, and 83 to the nozzle 61 is larger than the flow passage cross-sectional area of the flow passage 65. The cross-sectional area of the filters 81, 82, and 83 is an area including open areas of the pores. In the first embodiment, the cross-sectional area of the filters 81, 82, and 83 corresponds to an area of the filters 81, 82, and 83 when viewed in the direction from the flow passage 65 to the nozzle 61. When viewed in the direction from the flow passage 65 to the nozzle 61, the main filter 81 has an outer peripheral portion 81f extending outward from an area overlapping the end portion of the flow passage 65 on the nozzle 61 side. In the first embodiment, an end portion of the outer peripheral portion 81f extends to a side wall surface of the filter chamber 85. In another embodiment, the end portion of the outer peripheral portion 81f may not extend to the side wall surface of the filter chamber 85 or may extend only to a front side of the side wall surface of the filter chamber 85.

The nozzle unit 60A includes a unit member 67 having a space therein constituting the flow passage 65 and the filter chamber 85 and a nozzle member 68 constituting the nozzle 61 and having a space therein constituting the nozzle flow passage 63. The nozzle member 68 is detachably attached to the unit member 67. In the first embodiment, the nozzle member 68 is screw-coupled to the unit member 67 through a screw groove provided around the nozzle flow passage 63. In another embodiment, the nozzle member 68 may be detachably attached to the unit member 67 by another method. The nozzle member 68 may be detachably attached to the unit member 67 through a screw and a bolt.

When the nozzle unit 60A is assembled, after the filters 81, 82, and 83 are arranged in a concave portion constituting the filter chamber 85 in the unit member 67, the nozzle member 68 is fixed to the unit member 67. In the first embodiment, the filters 81, 82, and 83 are interposed between the unit member 67 and the nozzle member 68 in the lamination direction to be fixed to the filter chamber 85. It is preferable that the filters 81, 82, and 83 are detachably fixed while being interposed between the unit member 67 and the nozzle member 68 without being joined to the unit member 67 and the nozzle member 68. Since the filters 81, 82, and 83 are fixed to the nozzle unit 60A in a detachable state, maintenance such as cleaning or replacement of the filters 81, 82, and 83 is facilitated.

It is preferable that before being assembled with the nozzle unit 60A, the filters 81, 82, and 83 are joined to each other through, for example, spot welding, and are integrated. Accordingly, when the nozzle unit 60A is assembled or when the above-described maintenance is performed, handling of the filters 81, 82, and 83 is facilitated. Further, when the main filter 81 is integrated while being interposed between the flow passage-side filter and the nozzle-side filter 83, if the handling of the filters 81, 82, and 83 is performed, fine pores of the main filter 81 can be protected by the flow passage-side filter 82 and the nozzle-side filter 83.

In the nozzle unit 60A, foreign substances in the shaping material having a size that is larger than the pore diameter of the pores of the main filter 81 can be supplemented or removed by the main filter 81 provided between the flow passage 65 and the nozzle 61. Further, as will be described below, even on the flow passage 65 side from the main filter 81, foreign substances in the shaping material having a size that is larger than the pore diameter of the pores of the flow passage-side filter 82 can be supplemented and removed. Thus, it is possible to suppress blocking of the nozzle 61 due to the foreign substances having such a size and a reduction in shaping accuracy due to mixing of the foreign substances with the shaped object.

In the nozzle unit 60A, the filter unit 80A is provided closer to the nozzle 61 than the opening and closing mechanism 72 of the flow rate controller 70. Therefore, while the opening and closing mechanism 72 is closed, the filter unit 80A can supplement a mass of a degraded material or the shaping material generated on the nozzle 61 side from the opening and closing mechanism 72. Further, in the nozzle unit 60A, the filter unit 80A is provided closer to the nozzle 61 than the negative pressure generating mechanism 75 of the flow rate controller 70. Therefore, it is possible to alleviate the clogging of the filters 81, 82, and 83 due to the backflow of the shaping material generated by the negative pressure generating mechanism 75. Further, in the nozzle unit 60A, as will be described below, the increase in pressure loss of the shaping material in the nozzle unit 60A is suppressed by the main filter 81 for pores having a small diameter.

When the shaping material is discharged from the nozzle 61, the shaping material of the flow passage 65 mostly passes through the pores of the flow passage-side filter 82 in an area facing the flow passage 65, in a direction from the flow passage 65 to the nozzle 61. Thus, the shaping material passes through the pores of the main filter 81 located at a position overlapping with the pores of the flow passage-side filter 82, and further passes through the pores of the nozzle-side filter 83 located at a position overlapping with the pores of the main filter 81.

A part of the shaping material of the flow passage 65 reaches the pores of the outer peripheral portion 81f of the main filter 81 via the pores of the flow passage-side filter 82 and a gap formed between a wall surface of the first filter chamber 86 and the flow passage-side filter 82 due to minute unevenness in the surface of the flow passage-side filter 82.

Further, the part of the shaping material having passed through the flow passage-side filter 82 reaches the pores of the outer circumferential portion 81f of the main filter 81 via a gap formed in a boundary between the flow passage-side filter 82 and the main filter 81 due to minute unevenness in the surfaces of the filters 81 and 82. The part of the shaping material having passed through the pores of the outer peripheral portion 81f of the main filter 81 reaches the nozzle flow passage 63 via a minute gap between the main filter 81 and the nozzle-side filter 83 and a minute gap between the nozzle-side filter 83 and a wall surface of the second filter chamber 87. In this way, in the filter unit 80A, the pores of the outer peripheral portion 81f of the main filter 81 function as a flow passage of the shaping material, and the increase in pressure loss of the shaping material by having disposed the main filter 81 is suppressed by that much.

In the nozzle unit 60A, as described above, the flow passage-side filter 82 is disposed to cover the surface of the main filter 81 on the flow passage 65 side. Accordingly, the main filter 81 is supported on the flow passage-side filter 82, and deformation of the main filter 81 due to the pressure of the shaping material is suppressed. Thus, durability of the main filter 81 is enhanced. In particular, the support of the main filter 81 by the flow passage-side filter 82 can obtain a higher effect against the backflow of the shaping material, which is generated when the negative pressure is generated in the flow passage 65 by the negative pressure generating mechanism 75 of the flow rate controller 70 described in FIG. 4.

In the nozzle unit 60A, as described above, the nozzle-side filter 83 is disposed to face the surface of the main filter 81 on the nozzle 61 side. Accordingly, the main filter 81 is supported from the nozzle 61 side by the nozzle-side filter 83 with respect to flow of the shaping material from the flow passage 65 to the nozzle 61, so that deformation of the main filter 81 is suppressed. Thus, the durability of the main filter 81 is enhanced.

Figure 6:
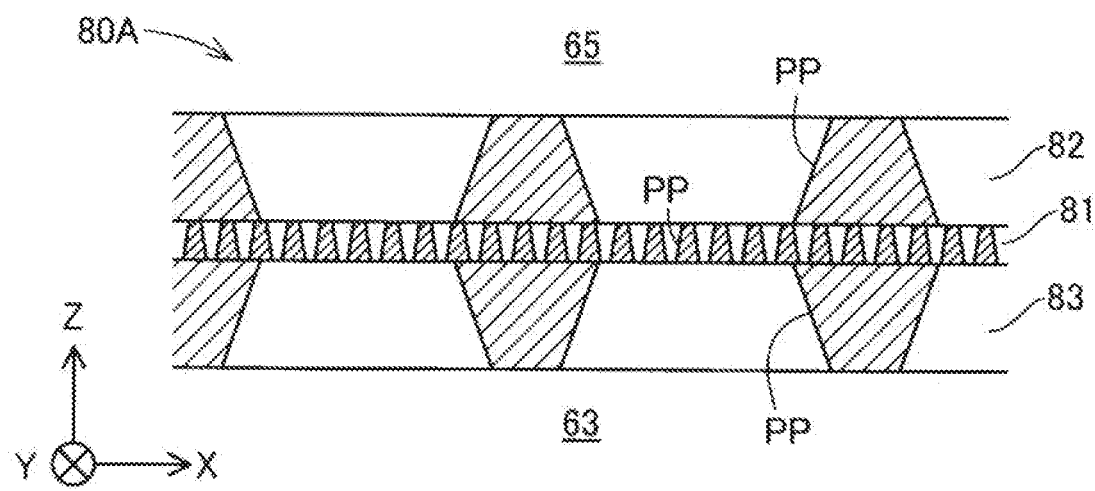
FIG. 6 is a schematic view showing a configuration of pores of a filter according to the first embodiment.

Details of the pores PP of the filters 81, 82, and 83 will be described below with reference to FIG. 6. FIG. 6 schematically illustrates a schematic cross section passing through a central axis of the pores PP of the filters 81, 82, and 83. A configuration in which the pore diameters of the pores PP of the flow passage-side filter 82 and the nozzle-side filter 83 are equal to each other and the respective pores PP are arranged to overlap with each other in the Z direction is shown in FIG. 6. However, since the drawing is just a schematic view, the configuration of the pores PP of the filters 81, 82, and 83 is not limited to the illustrated configuration. For example, the pore diameters of the pores PP of the flow passage-side filter 82 and the nozzle-side filter 83 may not be equal to each other or may be different from each other. Further, the pores PP of the flow passage-side filter 82 and the nozzle-side filter 83 may be arranged to be offset from each other in the X direction or the Y direction.

Among the filters 81, 82, and 83, a minimum value of the pore diameters of the pores PP of at least the main filter 81 is smaller than an opening diameter of the discharge port 62 of the nozzle 61. The minimum value of the pore diameters of the pores PP means a minimum value of diameters of portions of the pores PP in the thickness direction. Further, when the discharge port 62 has a configuration in which a plurality of openings are arranged, the opening diameter of the discharge port 62 means an opening diameter of each of the plurality of openings. When the opening diameter of the discharge port 62 of the nozzle 61 is equal to or less than 100 µm, the minimum value of the pore diameters of the pores PP in the main filter 81 may be less than, for example, 100 µm.

The minimum value of the pore diameters of the pores PP of the flow passage-side filter 82 and the nozzle-side filter 83 is greater than the minimum value of the pore diameters of the pores PP of the main filter 81. The minimum value of the pore diameters of the pores PP of the flow passage-side filter 82 and the nozzle-side filter 83 may be about 5 to 10 times the minimum value of the pore diameters of the pores PP of the main filter 81.

As described above, the minimum value of the pore diameters of the pores PP of the flow passage-side filter 82 is greater than the minimum value of the pore diameters of the pores PP of the main filter 81. Accordingly, the increase in the pressure loss of the flow passage of the shaping material is suppressed by the provided flow passage-side filter 82. Further, reaching, to the main filter 81, the foreign substances having a larger size than the pore diameter of the pores PP of the flow passage-side filter 82 is suppressed, and occurrence of the clogging of the main filter 81 is suppressed.

The minimum value of the pore diameters of the pores PP of the nozzle-side filter 83 is greater than the minimum value of the pore diameters of the pores PP of the main filter 81. Accordingly, the increase in the pressure loss of the flow passage of the shaping material is suppressed by the provided nozzle-side filter 83. Further, reaching, to the main filter 81, the foreign substances introduced from the discharge port 62 of the nozzle 61 and having a larger size than the pore diameters of the pores PP of the nozzle-side filter 83 is suppressed. Therefore, the occurrence of the clogging of the main filter 81 is suppressed.

In the first embodiment, the pore diameters of the pores PP of the filters 81, 82, and 83 gradually increase or decrease as the pores PP go from the flow passage 65 side to the nozzle 61 side. This shape can be realized by performing processing such as etching or pressing only from one surface of the base material when the pores PP are formed in a film-like member that is a base material of the filters 81, 82, and 83. According to the filters 81, 82, and 83, the foreign substances having a larger size than the pore diameter of a portion having a small pore diameter can be removed from the shaping material. The increase in the pressure loss of the shaping material is suppressed by a portion having a large pore diameter.

It is preferable that the main filter 81 is disposed such that the pore diameter of the pores PP becomes gradually smaller as the main filter 81 goes from the flow passage 65 side to the nozzle 61 side. Accordingly, the foreign substances fitted in the pores PP of the main filter 81 from the flow passage 65 side can easily float from the main filter 81 to the flow passage 65, so that the occurrence of the clogging of the main filter 81 can be suppressed. Further, for example, in the maintenance processing or the shaping processing described above, when the negative pressure generating mechanism 75 of the flow rate controller 70 generates the negative pressure in the flow passage 65, the clogging of the main filter 81 is easily alleviated by the pressure of the backflowing shaping material.

Even in the flow passage-side filter 82, similar to the main filter 81, it is preferable that the flow passage-side filter 82 is disposed such that the pore diameter of the pores PP becomes gradually smaller as the flow passage-side filter 82 goes from the flow passage 65 side to the nozzle 61 side. Accordingly, the foreign substances fitted in the pores PP of the flow passage-side filter 82 from the flow passage 65 side can easily float from the flow passage-side filter 82 to the flow passage 65, so that the occurrence of the clogging of the flow passage-side filter 82 can be suppressed. Further, as described above, when the backflow of the shaping material is generated by the negative pressure generating mechanism 75 or the like, the clogging of the flow passage-side filter 82 can be alleviated.

It is preferable that the nozzle-side filter 83 is disposed such that the pore diameter of the pores PP becomes gradually larger as the nozzle-side filter 81 goes from the flow passage 65 side to the nozzle 61 side. Accordingly, the foreign substances introduced from the discharge port 62 of the nozzle 61 and fitted in the pores PP of the nozzle-side filter 83 can return to the nozzle 61 side by the pressure of the shaping material. Further, it is possible to suppress staying of fine particles having passed through the main filter 81 in the pores PP of the nozzle-side filter 83. Thus, the occurrence of the clogging of the nozzle-side filter 83 can be suppressed.

As described above, according to the nozzle unit 60A and the shaping apparatus 100 including the same according to the first embodiment, the filters 81, 82, and 83 are provided in the flow passage of the shaping material, so that blocking of the discharge port 62 of the nozzle 61 by the foreign substances in the shaping material can be suppressed. Further, the area of the main filter 81 is larger than a flow passage cross-sectional area of the flow passage 65, and the increase in the pressure loss of the shaping material is suppressed by providing the main filter 81, by an amount by which the shaping material can pass through the pores of the outer peripheral portion 81f of the main filter 81. In addition, according to the nozzle unit 60A and the shaping apparatus 100 including the same according to the first embodiment, various effects described in the first embodiment can be achieved.

2. Second Embodiment

Figure 7:
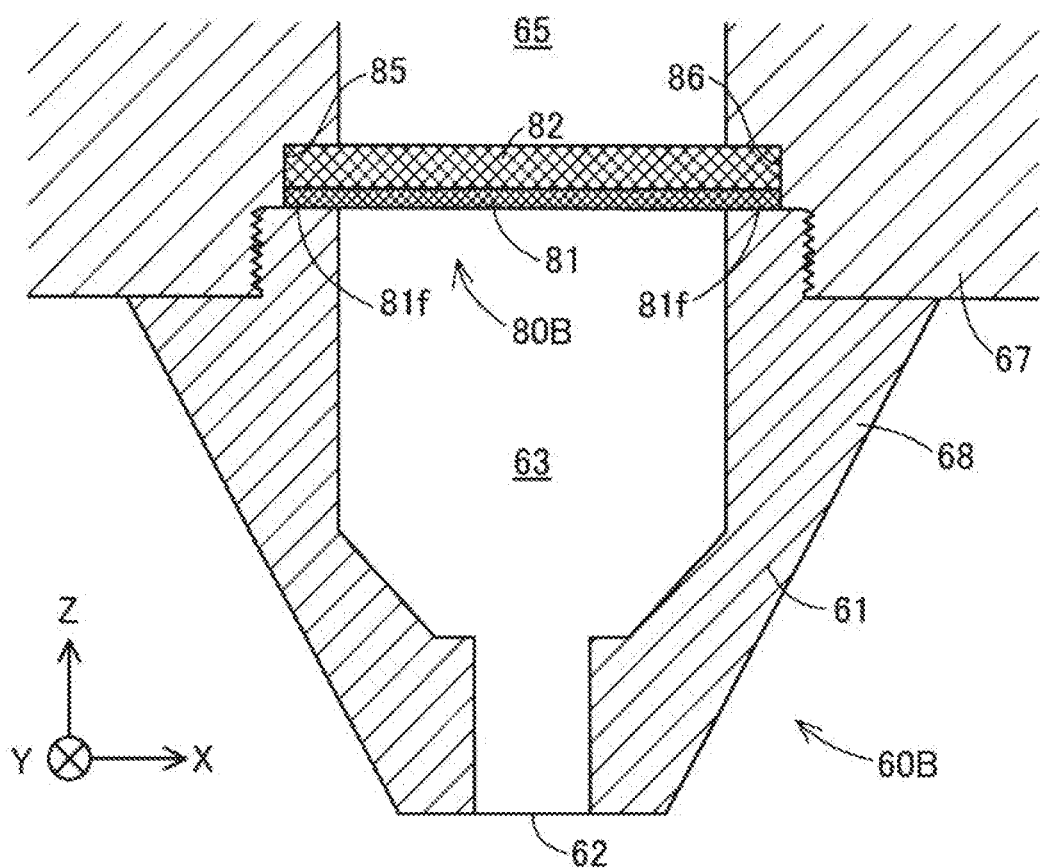
FIG. 7 is a schematic view showing a configuration of a filter unit according to a second embodiment.

FIG. 7 is a schematic view showing a configuration of the filter unit 80B provided in a nozzle unit 60B according to a second embodiment. The shaping apparatus including the nozzle unit 60B according to the second embodiment has substantially the same configuration as the shaping apparatus 100 described in the first embodiment. The configuration of the nozzle unit 60B according to the second embodiment is substantially the same as the configuration of the nozzle unit 60A according to the first embodiment except that the filter unit 80B according to the second embodiment is included instead of the filter unit 80A according to the first embodiment. The configuration of the filter unit 80B according to the second embodiment is substantially the same as the configuration of the filter unit 80A according to the first embodiment except that the nozzle-side filter 83 and the second filter chamber 87 are omitted. According to the nozzle unit 60B and the shaping apparatus including the same according to the second embodiment, various effects similar to the effects described in the first embodiment can be achieved by the configuration common to the first embodiment, such as the main filter 81 and the flow passage-side filter 82.

3. Third Embodiment

Figure 8:
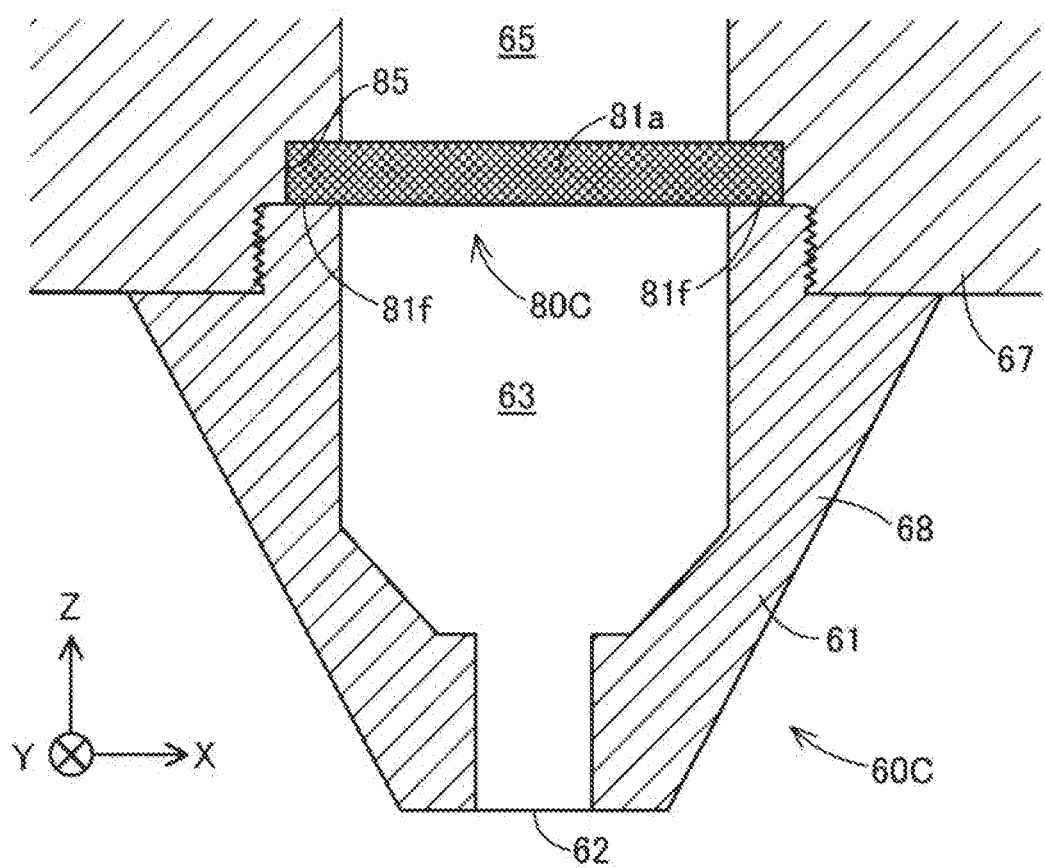
FIG. 8 is a schematic view showing a configuration of a filter unit according to a third embodiment.

FIG. 8 is a schematic view showing a configuration of a filter unit 80C provided in a nozzle unit 60C according to a third embodiment. The shaping apparatus including the nozzle unit 60C according to the third embodiment has substantially the same configuration as the shaping apparatus 100 described in the first embodiment. The configuration of the nozzle unit 60C according to the third embodiment is substantially the same as the configuration of the nozzle unit 60A according to the first embodiment except that the filter unit 80C according to the third embodiment is included instead of the filter unit 80A according to the first embodiment.

In the filter unit 80C according to the third embodiment, a filter 81a having a single-layer structure is accommodated in the filter chamber 85. Hereinafter, the filter 81a is referred to as a "single-layer filter 81a". In the third embodiment, the filter chamber 85 is filled with the single-layer filter 81a. Therefore, it is preferable that the single-layer filter 81a has pores having a three-dimensional structure. Accordingly, the shaping material can pass through the pores in the thickness direction while being diffused in a direction along a surface inside the single-layer filter 81a. Therefore, when viewed from the flow passage 65 toward the nozzle 61, the outer peripheral portion 81f of the single-layer filter 81a located outside an area overlapping with an end portion of the flow passage 65 on the nozzle 61 side can function as a flow passage of the shaping material. According to the nozzle unit 60C and the shaping apparatus including the same according to the third embodiment, various effects similar to those described in the first embodiment can be achieved.

4. Fourth Embodiment

Figure 9:
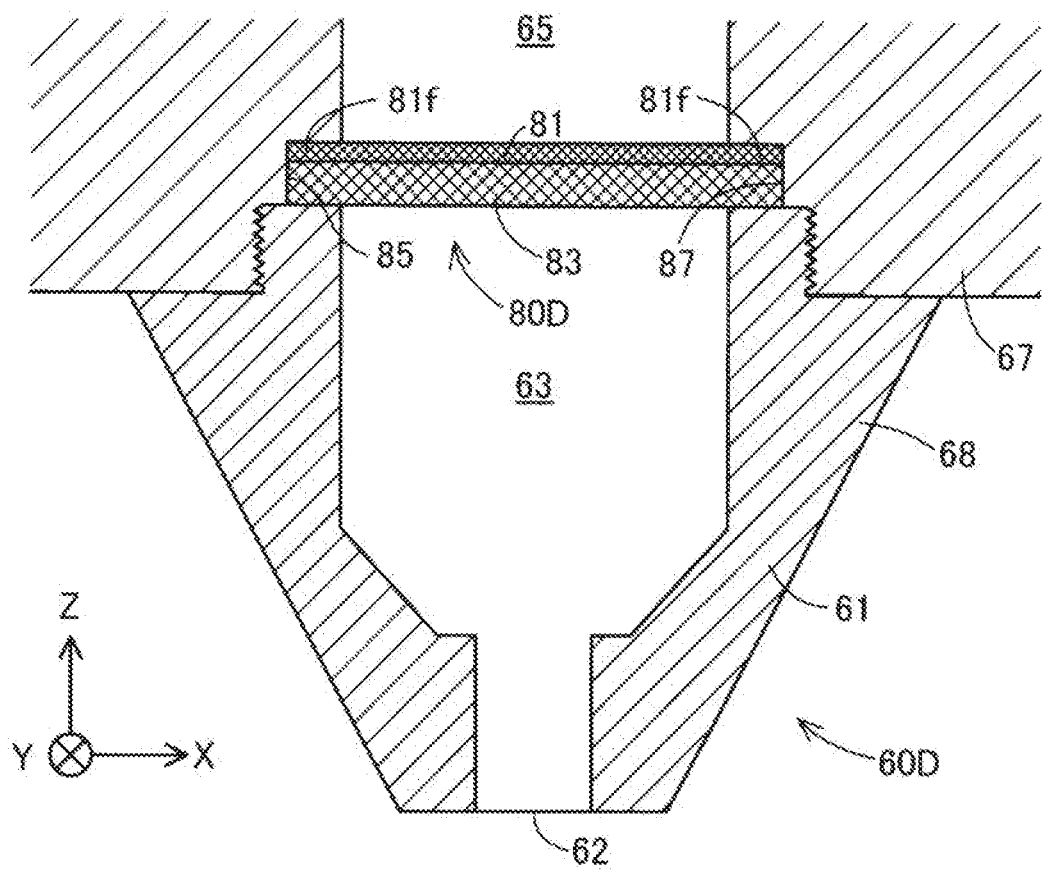
FIG. 9 is a schematic view showing a configuration of a filter unit according to a fourth embodiment.

FIG. 9 is a schematic view showing a configuration of a filter unit 80D provided in a nozzle unit 60D according to a fourth embodiment. The shaping apparatus including the nozzle unit 60D according to the fourth embodiment has substantially the same configuration as the shaping apparatus 100 described in the first embodiment. The configuration of the nozzle unit 60D according to the fourth embodiment is substantially the same as the configuration of the nozzle unit 60A according to the first embodiment except that the filter unit 80D according to the fourth embodiment is included instead of the filter unit 80A according to the first embodiment. The configuration of the filter unit 80D according to the fourth embodiment is substantially the same as the configuration of the filter unit 80A according to the first embodiment except that the flow passage-side filter 82 and the second filter chamber 87 are omitted. According to the nozzle unit 60D and the shaping apparatus including the same according to the fourth embodiment, various effects similar to those described in the first embodiment can be achieved.

5. Fifth Embodiment

Figure 10:
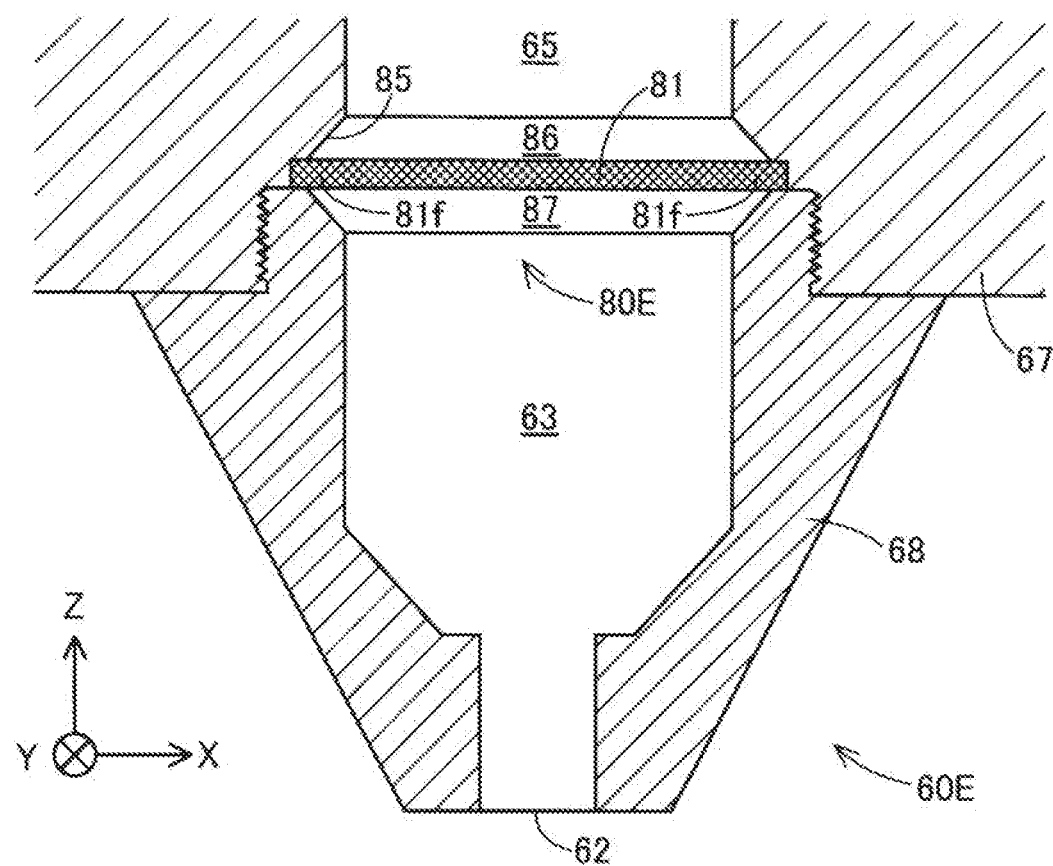
FIG. 10 is a schematic view showing a configuration of a filter unit according to a fifth embodiment.

FIG. 10 is a schematic view showing a configuration of a filter unit 80E provided in a nozzle unit 60E according to a fifth embodiment. The shaping apparatus including the nozzle unit 60E according to the fifth embodiment has substantially the same configuration as the shaping apparatus 100 described in the first embodiment. The configuration of the nozzle unit 60E according to the fifth embodiment is substantially the same as the configuration of the nozzle unit 60A according to the first embodiment except that the filter unit 80E according to the fifth embodiment is included instead of the filter unit 80A according to the first embodiment.

The configuration of the filter unit 80E according to the fifth embodiment is substantially the same as the configuration of the filter unit 80A according to the first embodiment except for the fact described below. In the filter unit 80E, the main filter 81 having a single-layer structure is disposed in the filter chamber 85. In the filter unit 80E, the flow passage-side filter 82 is not disposed in the first filter chamber 86, and the nozzle-side filter 83 is not disposed in the second filter chamber 87. An outer peripheral end of the main filter 81 is interposed between the unit member 67 and the nozzle member 68 and is held in the filter chamber 85. Even in the fifth embodiment, the cross-sectional area of a cross section perpendicular to a direction from the flow passage 65 of the first filter chamber 86 and the second filter chamber 87 to the nozzle 61 is larger than the flow passage cross-sectional area of the flow passage 65. However, in the filter unit 80E according to the fifth embodiment, the cross-sectional area of the first filter chamber 86 becomes larger as it goes from the flow passage 65 side to the nozzle 61 side. Further, the cross-sectional area of the second filter chamber 87 becomes smaller as it goes from the flow passage 65 side to the nozzle 61 side.

Even in the filter unit 80E, the pores of the outer peripheral portion 81f of the main filter 81 can function as a flow passage of the shaping material. Therefore, the increase in the pressure loss of the flow passage of the shaping material can be suppressed by the provided main filter 81. In addition, according to the nozzle unit 60E and the shaping apparatus including the same according to the fifth embodiment, various effects similar to those described in the first embodiment can be achieved.

6. Sixth Embodiment

Figure 11:
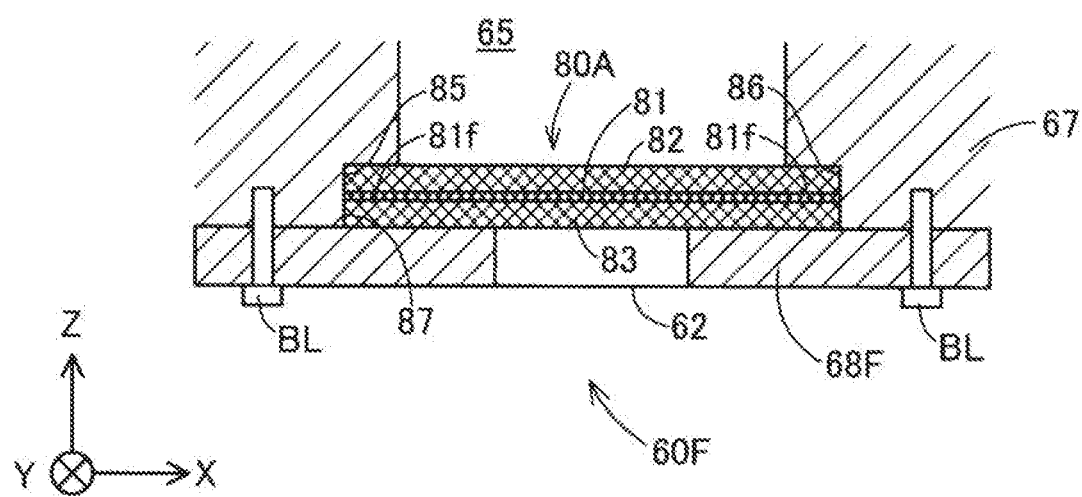
FIG. 11 is a schematic view showing a configuration of a nozzle unit according to a sixth embodiment.

FIG. 11 is a schematic view showing a configuration of a nozzle unit 60F according to a sixth embodiment. The shaping apparatus including the nozzle unit 60F according to the sixth embodiment has substantially the same configuration as the shaping apparatus 100 described in the first embodiment. The configuration of the nozzle unit 60F according to the sixth embodiment is substantially the same as the configuration of the nozzle unit 60A according to the first embodiment except that a nozzle member 68F having a different configuration is included instead of the nozzle member 68 described in the first embodiment.

The nozzle member 68 according to the sixth embodiment is configured with a metal plate member and is fixed to the unit member 67 through a bolt BL. The discharge port 62 is provided as a through-hole penetrating the nozzle member 68 in the thickness direction. The nozzle member 68F is disposed such that the discharge port 62 faces the nozzle-side filter 83. In the nozzle unit 60F, the nozzle flow passage 63 between the filter unit 80A and the nozzle 61 is omitted.

According to the nozzle unit 60F and the shaping apparatus including the same according to the sixth embodiment, an apparatus configuration is simplified by the nozzle member 68F. In addition, according to the nozzle unit 60F and the shaping apparatus including the same according to the sixth embodiment, various effects similar to those described in the first embodiment can be achieved.

7. Another Embodiment

For example, the various configurations described in the above-described embodiments can be modified as follows. Similar to the above-described embodiments, all other embodiments described below are regarded as an example of a mode for carrying out the disclosure.

(1) Another Embodiment 1

In the first embodiment, the second embodiment, the fourth embodiment, the fifth embodiment, and the sixth embodiment, similar to the single-layer filter 81a according to the third embodiment, the main filter 81 may be configured with a member having a three-dimensional mesh structure. The same configuration is applied to the flow passage-side filter 82 and the nozzle-side filter 83. In the embodiments except for the fifth embodiment, the filter chamber 85 may have a space where no filter is disposed on at least one of the flow passage 65 side and the nozzle 61 side.

(2) Another Embodiment 2

In the above-described embodiments, the main filter 81 may not have a configuration in which the pore diameter of the pores increases in the thickness direction. The main filter 81 may have a configuration in which the pore diameter of the pores is substantially constant in the thickness direction, and may have a configuration in which the pore diameter of the pores increases from the center in the thickness direction toward both sides. The same configuration is applied to the flow passage-side filter 82 and the nozzle-side filter 83. Further, in the above-described embodiments, the main filter 81 may be disposed such that the pore diameter of the pores becomes gradually larger as it goes from the flow passage 65 side to the nozzle 61 side. The same configuration is applied to the flow passage-side filter 82. In the above-described embodiments, the nozzle-side filter 83 may be disposed such that the pore diameter of the pores becomes gradually smaller as it goes from the flow passage 65 side to the nozzle 61 side.

(3) Another Embodiment 3

In the nozzle units 60A to 60F according to the above-described embodiments, the flow rate controller 70 may be omitted. Further, among the flow rate controller 70, only the opening and closing mechanism 72 may be included or only the negative pressure generating mechanism 75 may be included. In the nozzle units 60A to 60F according to the above-described embodiments, the opening and closing mechanism 72 may not be configured with a butterfly valve or may be configured with, for example, a shutter and a plunger that drive opening and closing of the flow passage 65. The negative pressure generating mechanism 75 may not have a configuration for generating a negative pressure in the flow passage 65 by moving the moving body 78 in the sub-passage 77. Instead, for example, the negative pressure generating mechanism 75 may have a configuration for generating a negative pressure in the flow passage 65 through the sub-passage 77 by a suction pump.

(4) Another Embodiment 4

In the above-described embodiments, the filters 81 and 81a may not be detachably fixed to the nozzle units 60A to 60F. For example, outer peripheral end portions of the filters 81 and 81a may be joined and fixed to a wall surface of the filter chamber 85. The nozzle member 68F according to the sixth embodiment may be applied to the nozzle unit 60B, 60C, 60D, and 60E according to the second embodiment, the third embodiment, the fourth embodiment, and the fifth embodiment.

(5) Another Embodiment 5

Instead of a configuration using a flat screw 40, the generation unit 30 may have a configuration in which the shaping material is extruded from the nozzle 61 by rotating an in-line screw of which the length in the Z direction is longer than the diameter thereof. Further, the shaping apparatus 100 may not have the configuration using the flat screw 40 or the above-described in-line screw but may adopt a normal FDM method (a thermal melting and laminating method). In the shaping apparatus 100, a configuration may be adopted in which a filament is delivered from a bobbin on which the filament made of thermoplastic resin is wound to a nozzle and the filament is melted by a heater provided in the nozzle and is discharged from the nozzle as the shaping material.

(6) Another Embodiment 6

In the above-described embodiments, the material supplying unit 20 may include a plurality of hoppers. In this case, different materials may be supplied from the hoppers to the flat screw 40 and may be mixed in the groove portion 42 of the flat screw 40 to generate the shaping material. For example, the powder material serving as the main material described in the above-described embodiments and a solvent, a binder, or the like added to the powder material may be simultaneously supplied from the separate hoppers to the flat screw 40.

8. Another Aspect

The present disclosure is not limited to the above-described embodiments and examples, and can be realized in various aspects without departing from the spirit thereof. For example, the present disclosure can be realized by the following aspects. Technical features in the above embodiments corresponding to technical features in each embodiment described below can be appropriately replaced or combined in order to solve some or all of the problems of the present disclosure or achieve some or all of the effects of the present disclosure. Further, unless these technical features are described as essential in the specification, the technical features can be appropriately deleted.

(1) According to a first aspect, there is provided a three-dimensional shaping apparatus including: a generation unit that generates a melted shaping material; a nozzle that discharges the shaping material generated by the generation unit; a flow passage through which the shaping material is guided to the nozzle; a filter chamber that is provided between the flow passage and the nozzle, a cross-sectional area of a cross section perpendicular to a direction from the flow passage toward the nozzle being larger than a flow passage cross-sectional area, which is a cross-sectional area of the flow passage, of a cross section perpendicular to a flowing direction of the shaping material in the flow passage; and a filter that has pores through which the shaping material passes and is disposed in the filter chamber, a cross-sectional area of a cross section perpendicular to a direction from the flow passage toward the nozzle being larger than the flow passage cross-sectional area.

According to the three-dimensional shaping apparatus of this aspect, foreign substances mixed in the shaping material can be removed by the filter disposed between the flow passage and the nozzle. Therefore, it is possible to suppress blocking of the nozzle due to the foreign substances and a reduction in shaping accuracy due to mixing of foreign substances in a three-dimensional shaped object. Further, since a portion of the filter, functioning as the flow passage of the shaping material, increases by an amount by which the cross-sectional area of the filter is larger than the cross-sectional area of the flow passage, it is possible to suppress an increase in pressure loss of the shaping material due to the provided filter.

(2) In the three-dimensional shaping apparatus of the aspect, pore diameters of the pores of the filter may gradually increase or decrease as it goes from the flow passage side to the nozzle side.

According to the three-dimensional shaping apparatus of this aspect, foreign substances having finer sizes can be removed by portions of the pores having small sizes. Further, the increase in the pressure loss of the filter can be suppressed by portions of the pores having large sizes. In addition, the filter is disposed such that the pore diameters of the pores become smaller in a direction from the flow passage toward the nozzle, so that the foreign substances supplemented to the pores can easily float from the filter to the flow passage side, and occurrence of clogging of the filter can be suppressed.

(3) In the three-dimensional shaping apparatus of the aspect, the filter may be a main filter disposed such that the filter chamber is divided into a first filter chamber on the flow passage side and a second filter chamber on the nozzle side.

According to the three-dimensional shaping apparatus of this aspect, the first filter chamber and the second filter chamber are included. Thus, when viewed in a direction from the flow passage to the nozzle, the shaping material is easily guided to an outer peripheral portion of the main filter located outside an area overlapping with an end portion the flow passage on the nozzle side. Further, the increase in the pressure loss of the shaping material can be further suppressed by the provided filter.

(4) In the three-dimensional shaping apparatus of the aspect, in the first filter chamber, a flow passage-side filter having pores through which the shaping material passes may be disposed to cover the main filter, and a minimum value of pore diameters of the pores of the flow passage-side filter may be larger than a minimum value of pore diameters of the pores of the main filter.

According to the three-dimensional shaping apparatus of the aspect, the main filter is supported on the flow passage-side filter having pores having large pore diameters, so that durability of the main filter can be improved while the increase in the pressure loss is suppressed. Further, after foreign substances having large sizes are supplemented to the flow passage-side filter, foreign substances having small sizes can be supplemented to the main filter, so that the occurrence of the clogging of the main filter can be suppressed.

(5) In the three-dimensional shaping apparatus of the aspect, pore diameters of the pores of the flow passage-side filter may gradually decrease as it goes from the flow passage side to the nozzle side.

According to the three-dimensional shaping apparatus of this aspect, a state in which the foreign substances supplemented to the pores of the flow passage-side filter can easily float from the flow passage-side filter to the flow passage side becomes possible.

(6) In the three-dimensional shaping apparatus of the aspect, in the second filter chamber, the nozzle-side filter having pores through which the shaping material passes may be disposed to cover the main filter, and a minimum value of pore diameters of the pores of the nozzle-side filter may be less than a minimum value of pore diameters of the pores of the main filter.

According to the three-dimensional shaping apparatus of the aspect, the main filter is supported on the nozzle-side filter having pores having large pore diameters, so that durability of the main filter can be improved while the increase in the pressure loss is suppressed. Further, reaching of the foreign substances introduced from the nozzle to the main filter can be suppressed by the nozzle-side filter.

(7) In the three-dimensional shaping apparatus of the aspect, pore diameters of the pores of the nozzle-side filter may gradually increase as it goes from the flow passage side to the nozzle side.

According to the three-dimensional shaping apparatus of this aspect, since the foreign substances supplemented to the nozzle-side filter are easily removed by the pressure of the shaping material, the clogging of the nozzle-side filter is suppressed.

(8) The three-dimensional shaping apparatus of the aspect may include a unit member including the filter chamber and having a concave portion, and a nozzle member constituting the nozzle and detachably attached to the unit member, in which the filter is detachably fixed to the concave portion between the unit member and the nozzle member.

According to the three-dimensional shaping apparatus of this aspect, maintenance of the filter can be easily performed.

(9) In the three-dimensional shaping apparatus of the aspect, at least one of an opening and closing mechanism that opens and closes the flow passage and a negative pressure generating mechanism that generates a negative pressure in the flow passage by sucking the shaping material from the flow passage may be provided in the flow passage.

According to the three-dimensional shaping apparatus of this aspect, since a discharge amount of the shaping material can be suppressed by the opening and closing mechanism and the negative pressure generating mechanism, shaping accuracy of a three-dimensional shaped object can be improved. Further, the foreign substances generated in the nozzle side from the opening and closing mechanism or the negative pressure generating mechanism can be removed by the filter.

(10) In the three-dimensional shaping apparatus of the aspect, the negative pressure generating mechanism may be provided in the flow passage, and processing of alleviating clogging of the filter by the negative pressure generated by the negative pressure generating mechanism may be executed.

According to the three-dimensional shaping apparatus of this aspect, it is possible to suppress occurrence of discharge failure of the shaping material from the nozzle due to the clogging of the filter.

(11) In the three-dimensional shaping apparatus of the aspect, the generation unit may include a flat screw and may generate the shaping material by rotating the flat screw.

According to the three-dimensional shaping apparatus of this aspect, the apparatus can be miniaturized by using the flat screw. Further, control accuracy of the discharge amount of the shaping material can be improved.

(12) According to a second aspect, there is provided a nozzle unit including: a nozzle that discharges a melted shaping material using three-dimensional shaping; a flow passage through which the shaping material is guided to the nozzle; a filter chamber that is provided between the flow passage and the nozzle, a cross-sectional area of a cross section perpendicular to a direction from the flow passage toward the nozzle being larger than a flow passage cross-sectional area, which is a cross-sectional area of the flow passage, of a cross section perpendicular to a flowing direction of the shaping material in the flow passage; and a filter having pores through which the shaping material passes and which is disposed in the filter chamber, a cross-sectional area of a cross section perpendicular to the direction from the flow passage toward the nozzle being larger than the flow passage cross-sectional area.

According to the nozzle unit of this aspect, foreign substances mixed in the shaping material can be removed by the filter disposed between the flow passage and the nozzle. Therefore, it is possible to suppress blocking of the nozzle due to the foreign substances and a reduction in shaping accuracy due to mixing of foreign substances in a three-dimensional shaped object. Further, since a portion of the filter, functioning as the flow passage of the shaping material, increases by an amount by which the cross-sectional area of the filter is larger than the cross-sectional area of the flow passage, it is possible to suppress an increase in pressure loss of the shaping material due to the provided filter.

The present disclosure can be realized in various forms other than the three-dimensional shaping apparatus or the nozzle unit. For example, the present disclosure can be realized in forms of a filter used in the three-dimensional shaping apparatus or the nozzle unit, a discharge apparatus for the shaping material, a flow passage structure of the three-dimensional shaping apparatus or the nozzle unit, and an arrangement structure of the filter.

What is claimed is:

1. A three-dimensional shaping apparatus comprising:
a material supply configured to provide a melted shaping material, wherein the material supply includes a flat screw and provides the melted shaping material by rotating the flat screw;
a nozzle configured to discharge the melted shaping material from the material supply, the nozzle including a nozzle flow passage defined by a first nozzle cylindrical wall of a first chamber and a second nozzle cylindrical wall of a second chamber, the first chamber being longer along a longitudinal axis than the second chamber, the first nozzle cylindrical wall having a first diameter and the second nozzle cylindrical wall having a second diameter, the first diameter tapering down to the second diameter in a tapered portion;
a flow passage configured to guide the shaping material to the nozzle, the flow passage being defined by a flow passage cylindrical wall, the flow passage cylindrical wall being concentric with the first nozzle cylindrical wall and the second nozzle cylindrical wall in a plan view, and a diameter of the flow passage cylindrical wall being at least as large as a diameter of the first nozzle cylindrical wall;
a filter chamber that is provided between the flow passage and the nozzle, a filter chamber cross-sectional area being larger than a flow passage cross-sectional area and a first chamber cross-sectional area, the filter chamber cross-sectional area being perpendicular to a direction from the flow passage toward the nozzle, and the flow passage cross-sectional area being perpendicular to a flowing direction of the shaping material in the flow passage;
a filter having a plurality of pores through which the shaping material passes, the filter being disposed in the filter chamber, a filter cross-sectional area being larger than the flow passage cross-sectional area and the first chamber cross-sectional area, the filter cross-sectional area being perpendicular to the direction from the flow passage toward the nozzle, the plurality of pores being arranged throughout the filter and within the filter chamber, the filter defining a filter flow path, the filter flow path extends through the filter within the flow passage cross-sectional area or the filter flow path extends through the filter outside of the flow passage cross-sectional area in a plan view; and at least one of a valve that opens and closes the flow passage and a negative pressure generating mechanism that generates a negative pressure in the flow passage by sucking the shaping material from the flow passage is provided in the flow passage.

2. The three-dimensional shaping apparatus according to claim 1, wherein pore diameters of the pores of the filter gradually increase or decrease from a flow passage side to a nozzle side.

3. The three-dimensional shaping apparatus according to claim 1, wherein the filter is a main filter disposed such that the filter chamber is divided into a first filter chamber on a flow passage side and a second filter chamber on a nozzle side.

4. The three-dimensional shaping apparatus according to claim 3, wherein in the first filter chamber, a flow passage-side filter having pores through which the shaping material passes is disposed to cover the main filter, and a minimum value of pore diameters of the pores of the flow passage-side filter is greater than a minimum value of pore diameters of the pores of the main filter.

5. The three-dimensional shaping apparatus according to claim 4, wherein the pore diameters of the pores of the flow passage-side filter gradually become smaller from the flow passage side toward the nozzle side.

6. The three-dimensional shaping apparatus according to claim 3, wherein in the second filter chamber, a nozzle-side filter having pores through which the shaping material passes is disposed to cover the main filter, and a minimum value of pore diameters of the pores of the nozzle-side filter is less than a minimum value of the pore diameters of the pores of the main filter.

7. The three-dimensional shaping apparatus according to claim 6, wherein the pore diameters of the pores of the nozzle-side filter gradually become larger as it goes from the flow passage side toward the nozzle side.

8. The three-dimensional shaping apparatus according to claim 1, further comprising:

a unit member having a concave portion including the filter chamber; and a nozzle member constituting the nozzle and detachably attached to the unit member, wherein the filter is detachably fixed to the concave portion between the unit member and the nozzle member.

9. The three-dimensional shaping apparatus according to claim 1, wherein the negative pressure generator is provided in the flow passage, and processing of alleviating clogging of the filter by the negative pressure generated by the negative pressure generator is executed.

* * * * *